United States Patent [19]

Patzschke et al.

[11] Patent Number: 4,623,690
[45] Date of Patent: Nov. 18, 1986

[54] CATHODICALLY PRECIPITABLE AQUEOUS ELECTRO-DIPCOATING AGENT

[75] Inventors: Hans-Peter Patzschke; Armin Göbel, both of Wuppertal; Reiner Böhmert, Haan, all of Fed. Rep. of Germany

[73] Assignee: Herberts Gesellschaft mit beschraenkter Haftung, Wuppertal, Fed. Rep. of Germany

[21] Appl. No.: 649,413

[22] Filed: Sep. 11, 1984

[30] Foreign Application Priority Data

Sep. 20, 1983 [DE] Fed. Rep. of Germany ....... 3333834

[51] Int. Cl.$^4$ ......................... C08L 51/00; C08L 77/00
[52] U.S. Cl. ..................................... 524/538; 524/539
[58] Field of Search ................................ 524/538, 539

[56] References Cited

U.S. PATENT DOCUMENTS

| | | | |
|---|---|---|---|
| 4,397,990 | 8/1983 | Kooymans et al. | 525/167 |
| 4,401,774 | 8/1983 | Kooymans et al. | 523/402 |
| 4,405,763 | 9/1983 | Kooymans et al. | 525/438 |
| 4,452,834 | 6/1984 | Nachthamp et al. | 524/539 |
| 4,458,054 | 7/1984 | Schmözer et al. | 525/327.3 |
| 4,505,981 | 3/1985 | Geist | 524/539 |

FOREIGN PATENT DOCUMENTS 3103642  8/1982  Fed. Rep. of Germany .

*Primary Examiner*—Lewis T. Jacobs
*Attorney, Agent, or Firm*—Schwartz, Jeffery, Schwaab, Mack, Blumenthal & Evans

[57] ABSTRACT

A cathodically precipitable aqueous electro-dipcoating agent which includes as Component A, 50 to 99% by mass (relative to the total quantity of Components A and B) of a synthetic resin binder having tertiary amino groups and hydroxyl groups which can be rendered water soluble by protonation with acids, and which (a) has an amine number of 35 to 120,
(b) has a hydroxyl number of 50 to 400,
(c) has substantially no primary, secondary and quaternary amino groups,
(d) has substantially no free isocyanate groups, and
(e) has substantially no blocked isocyanate groups which can react at baking temperatures of up to 200° C. with hydroxyl groups present in the reaction components.

The agent also includes as Component B, 1 to 50% by mass (relative to the total quantity of Components A and B) of substantially non-acid synthetic resins having at least two terminal esterified carboxyl groups which can react under normal lacquer baking conditions with Component A, accompanied by cross-linkage.

14 Claims, No Drawings

CATHODICALLY PRECIPITABLE AQUEOUS ELECTRO-DIPCOATING AGENT

The present invention relates to a cathodically precipitable aqueous electro-dipcoating agent.

The Applicant is aware that various organic binder systems can be dispersed in an aqueous medium, by means of salt formation, and can be precipitated by an electrophoretic method on a conductive, metallic article which is immersed in this aqueous dispersal or bath. Cataphoretically precipitable binders which are produced by reacting epoxy resins based on bisphenol A with amines or amino alcohols, are predominently used in practice as electrophoretic lacquers having good uniform coating properties and very good corrosion protection on unbonderized metal sheets. Thermal cross-linking of these lacquers can be effected by various methods, for example, by introducing blocked isocyanates (see German 'Auslegeschrift' No. 20 57 799, German 'Auslegeschrift' No. 21 31 060, German 'Auslegeschrift' No. 22 52 536, German 'Auslegeschrift' No. 22 69 195, German 'Auslegeschrift' 26 34 211) or by transimidation or ester interchanging methods (see European patent documents laid open to public inspection, Nos. 0004090, 012463, 040867, 066859, 082291; German 'Auslegeschriften' Nos. 31 03 642, 32 15 891, 32 24 864, 32 25 874, 33 15 469, 33 22 766).

A disadvantage of the resins hereinbefore described is their lack of resistance to atmospheric corrosion and their tendency to chalk. Their tendency to yellow renders the production of non-yellowing white lacquers difficult. Those resins hereinbefore described and which are used for ester interchanging methods, moreover, give rise to problems of adherence when further coatings are applied, eg. PVC.

In German 'Auslegeschrift' No. 30 07 004 there are described synthetic lacquer resins for electro-dipcoating. These resins can be obtained by reacting a polyisocyanate with polyhydroxyl compounds resulting in the formation of urethane prepolymers containing terminal isocyanate groups, and subsequently reacting the urethane prepolymer with a hydroxyl compound having a tertiary amino group and a hydroxyl compound having a quaternary ammonium group, resulting in the formation of a polyurethane having a tertiary amino group, quaternary ammonium groups, hydroxyl groups and blocked isocyanate groups. The quaternary ammonium groups remain during baking as flaws in the film.

From German 'Auslegeschrift' No. 29 20 985 there are known resins which may be obtained by reacting a polyisocyanate with a polyol and a monofunctional blocking agent, wherein an excess molar quantity of isocyanate groups (relative to the total quantity of the hydroxyl groups of the polyols and the functional groups of the monofunctional blocking agent) is introduced, and wherein an intermediate product having isocyanate groups is obtained. This intermediate product is reacted with a sufficient quantity of a tertiary amine having at least two hydroxyl groups so that there is a molar excess of the hydroxyl groups of the tertiary amine, relative to the isocyanate groups of the intermediate product. These final products contain blocked isocyanate groups which are inconvenient because the blocking groups are split off during a later baking process. Hence, these resins have the disadvantage that baking losses are rather high as a result of the blocking agents introduced. Volatile, low molecular alcohols, such as methanol or ethanol cannot be used as blocking agents because their urethanes are stable below about 250° C.

A combination of a resin having primary and/or secondary amino groups and a cross-linking agent which may be transimidated, and having $\beta$-hydroxyalkyl groups, is known from German 'Auslegeschrift' No. 31 03 642. According to page 22, lines 14 to 29 thereof, this resin can also be built up from polyisocyanates. However, no example thereof is provided. The production of such a resin is problematic since the isocyanate groups react not only with the primary or secondary amino groups, but various secondary reactions with ketimine groups which are required as protective groups, are possible (see K. Harada, Y. Mizoe, J. Furukawa, S. Yamashita: *Makro. Chem.* 132 (1970), P.295–304).

An object of this invention is to provide a cathodically precipitable aqueous electro-dipcoating agent whereby an improvement of the disadvantages hereinbefore described can be effected.

The present invention, accordingly provides a cathodically precipitable aqueous electro-dipcoating agent which includes as Component A:

50 to 99% by weight (relative to the total quantity of components A and B) of a synthetic resin binder having tertiary amino groups and hydroxyl groups which can be rendered water soluble by protonation with acids, and which (a) has an amine number of 35 to 120;

(b) has a hydroxyl number of 50 to 400;

(c) has substantially no primary, secondary and quaternary amino groups;

(d) has substantially no free isocyanate groups; and (e) has substantially no blocked isocyanate groups which react at baking temperatures of up to 200° C. with hydroxyl groups present in the components;

as Component B:

1 to 50% by weight (relative to the total quantity of components A and B) of substantially non-acid synthetic resins having at least two terminal esterified carboxyl groups which can react under normal lacquer baking conditions with component A, accompanied by cross-linkage; and as Component C:

An ester interchanging catalyst for the thermal ester interchange of Component A with Component B at a temperature of more than 140° C.

The dipcoating agent may include, one or more of a pigment, filler, protective corrosion inhibitors, lacquer vehicle, further catalyst and an organic solvent which, when present, is present in a quantity of up to 20% by mass, relative to the total weight of the dipcoating agent.

Important for the structure of the synthetic resin binder A are the urea and urethane groups in the chain of the molecules which are introduced by way of the isocyanate groups and which improve the adherence properties of the film. The tertiary amino groups impart water-solubility after neutralization with acids and the free hydroxyl groups cross-link with the cross-linking agent (component B) by ester interchange.

The preparation of the synthetic resin binder A is effected in a manner known per se, ie. by reacting optionally blocked polyisocyanates with compounds which have at least one tertiary nitrogen atom and have one or more of the following groups:

(a) at least 2 hydroxyl groups
(b) at least two secondary amino groups
(c) at least one primary amino group
(d) at least one hydroxyl and one secondary amino group and, if necessary, by reacting the intermediate product formed with sufficient polyhydroxyl compounds so that all possibly blocked isocyanate groups still present therein are reacted with hydroxyl groups. The amounts of the starting materials are selected so that the resultant reaction product has an amine number and hydroxyl number as hereinbefore described.

The equivalence ratio in Component A, between the reacted isocyanate groups and the total of the hydroxyl groups introduced thereinto, ie. the reacted and free hydroxyl groups, may be 1:1 to 1:4, preferably 1:1,2 to 1:2.

The quantity or amount of each starting compound is selected so that substantially none of the hereinbefore described groups (c), (d) and (e) are present in the resultant end product, ie. Component A. By "substantially" is meant that virtually no groups of this type are present, but, it is always possible that, when dealing with high molecular weight products of the type under discussion, a very negligible proportion of such groups can be present. Free isocyanate groups are entirely reacted as a rule because these react extremely readily with the excess hydroxyl groups. A very small number of primary, secondary and quaternary amino groups, for example, up to 5%, relative to the tertiary amino groups present, preferably up to 3% and particularly preferably up to 1%, has, as a rule, no disturbing effect and the definition "substantially no" is to be interpreted to cover such small numbers of the groups.

The same applies also to the blocked isocyanate groups, relative to the reacted isocyanate groups present in Component A. By suitable selection of the conditions of reaction, an expert in the art can ensure that virtually no blocked polyisocyanate groups are present in Component A.

The polyisocyanates may be aliphatic, cycloaliphatic and/or aromatic polyisocyanates having at least two isocyanate groups per molecule. Typical examples are isomers or isomer mixtures of toluylene diisocyanate, 4,4'-diphenyl methane diisocyanate, as well as their hydrogenation products, such as dicyclohexyl methane diisocyanate. Hexane-1,6-diisocyanate, 1,6-diisocyanateo-2,2,4-trimethyl hexane or isophorone diisocyanate may also be used. Mixed aliphatic-/aromatic compounds are also suitable. So-called blocked polyisocyanates may also be used for the reaction, such as, for example, the reaction product of diphenylmethane-4,4'-diisocyanate with two moles of cresol. Suitable blocking agents may be monofunctional compounds which have an active hydrogen atom (Zerewitinoff reaction), such as lower aliphatic or cycloaliphatic alcohols, phenols, oximes, lactams, imides, malonic or aceto-acetic acid ester. Products which are produced by trimerisation, reaction with water or partial reaction with trifunctional polyols, have proved suitable for triisocyanates, such as biuret produced from hexamethylene diisocyanate and water, isocyanurate of hexamethylene diisocyanate or the adduct of toluylene diisocyanate with trimethylol propane. When polyisocyanates which contain more than two isocyanate groups in the molecule are used, preferably a larger proportion of diisocyanate may be used concomitantly to avoid gelling. Preferably, aliphatic or cycloaliphatic polyisocyanates may be used in order to produce non-yellowing white lacquers.

Chain breaking agents may also be used in the production of Component A, for controlling the molecular weight or the structure of the molecule in a manner known to an expert in the art. For this purpose, for example, diamines which contain a tertiary or a primary amino group in the molecule, may be used. Examples thereof are dialkylamino alkyl amine having linear or branched aliphatic or cycloaliphatic radicals having 1 to 10 carbon atoms, such as dimethyl aminopropyl amino or diethyl aminoethyl amine. The introduction of the dimethyl amino group is particularly advantageous for the solubility and basicity of the resin. Therefore, at least one dimethylamino group per aminopolyurethane, may preferably be used. Other examples of chain breaking agents include amino alcohols which contain a tertiary amino group or a hydroxyl group, such as dimethyl aminoethanol, or also methoxypropyl amine.

The preparation of Component A may be performed by reacting the possibly blocked polyisocyanates with compounds of the aforedescribed type which contain at least one tertiary nitrogen atom and with polyhydroxyl compounds which do not contain tertiary nitrogen atoms. The preparation of this component can take place in one stage or successively in two stages. When it takes place in two stages, the polyisocyanates may first be converted with compounds containing at least one tertiary nitrogen atom to form an intermediate product possibly having blocked isocyanate groups, and this intermediate product may then be reacted with a sufficient quantity of polyhydroxyl compounds so that any blocked isocyanate groups still present therein, are reacted with hydroxyl groups. This preferred method has the advantage that the resin no longer contains free, non-incorporated amino groups.

Polyhydric alcohols which contain at least one tertiary nitrogen atom may also be used for introducing nitrogen groups. Preferably, the alcohols may be aliphatic diols such as N-alkyl-dialkanol amine, wherein aliphatic or cycloaliphatic radicals having 1 to 10 carbon atoms are used as the alkyl or alkane group. The alkyl group may, for example, be methyl, ethyl, butyl or cyclohexyl. The alkanol group may, for example, be ethanol, isopropanol, butanol or cyclohexanol. Suitable examples include N-methyl diethanol amine, N-methyl-diisopropanol amine or 1,2-propane diol-3-dimethyl amine. When tertiary amines having more than 2 hydroxyl groups are used, such as triethanol amine or triisopropanol amine, a larger proportion of N-alkyl-dialkanol amines may preferably be used to avoid gelling.

For example, N-dimethyl-N"-methyldiethylene diamine, N,N',N"-trimethyl diethylene triamine, N,N-dimethyl-N'-hydroxyethyl ethylene diamine or N,N'-dimethyl-N'-hydroxyethyl ethylene diamine as compounds containing tertiary amino groups may also be converted with polyisocyantes.

Branching in the molecules can result by the reaction of excess isocyanate groups with urea or urethane groups. When the diamines do not contain any tertiary nitrogen atom, they serve purely to extend the chains. Examples of compounds having at least two secondary amino groups are N,N'-dialkylene diamines such as dimethyl ethylene diamine, N,N'-dialkylpolyoxy alkylene diamine, cyanoalkylated alkylene diamines, such as bis-N,N'-cyanoethylethylene diamine, cyanoalkylated polyoxy alkylene diamines, such as bis-N,N'-cyanoethyl-polyoxy-propylene diamine. Linear, branched or cyclic organic radicals having 1 to 10 carbon atoms may be used as the alkyl or alkylene groups. Secondary diamines which contain in addition secondary hydroxyl groups, may also be prepared by reacting one mole of primary diamino alkane with two moles of monglycidyl ether or monoglycidyl ether, especially by reacting diaminohexane-1,6 with the glycidyl ester of α-branched fatty acids, such as the acid available under the trade name "Versatic".

The reaction of polyisocyanates with polyamines or amino alcohols may be effected in the presence of anhydrous solvents which cannot react with isocyanates, such as dimethyl diglycol ether, methyl isobutyl ketone or ethylacetate, at temperatures of about 0° C. to 80° C., in particular at about room temperature. The molar ratios of the reactants may be selected so that at least two isocyanate groups are present per molecule of the reaction product. The conversion of the polyamines and amino alcohols may also be performed with blocked polyisocyanates at higher reaction temperatures, such as 150° to 220° C., accompanied by the separation of the blocking agents. This method enables the use of less readily soluble or more highly fusible starting materials. The reaction product may then contain, for the further reaction, at least two blocked isocyanate groups.

The polyhydric alcohol for preparing Component A may contain on average more than two hydroxyl groups. The quantitative ratios may then be selected so that no more than one mole of polyhydric alcohol is introduced per NCO or isocyanide group available for this conversion. Hydroxyl groups are thereby introduced at the chain ends. When less polyhydric alcohol is used, preferably 0,5 to 1 mol, the chain length of an intermediate product containing amino groups is extended at the same time. When polyhydric alcohols having more than two hydroxyl groups are used, hydroxyl groups which are distributed over the chain, are also obtained. The polyhydric alcohols may include neopentyl glycol, bis-ethoxylated neopentyl glycol, hydroxy pivalic acid neo-pentyl glycol ester, hexane diol-1,6, 1,4-bis-(hydroxymethyl)-cyclohexane, 1,1-isopropylidene-bis-(p-phenoxy)-2-propanol, trimethylol propane, trimethylol ethane, glycerine, tris-(β-hydroxyethyl)isocyanurate, triethanol amine, diethanol amine, triisopropanol amine, diisopropanol amine, and triolamide, according to U.S. Pat. No. 3,766,118 and U.S. Pat. No. 3,766,119, pentaerythritol or the reaction product of pentaerythritol with dicarboxylic acids, for example, dimeric fatty acid. Howevewer, hydroxyl-group-containing polyethers or polyesters having different functionality and molecular weight may also be used. Examples, thereof, are polyglycol ether, polyester polyols, polyether polyols, polycaprolactone polyols or polycaprolactame polyols. Polyols having primary hydroxyl groups are preferred. Particular preference is given to polyols free of nitrogen groups, such as trimethylol propane and trimethylol ethane.

The reaction may take place at temperatures of 25° to 80° C. The polyhydric alcohols may be added to the intermediate product containing isocyanate groups, all at once or the intermediate product can be added dropwise to a prepared solution of the polyhydric alcohol. In order to convert all the isocyanate groups, it may be necessary towards the end of the reaction to elevate the temperature for a short time. When the isocyanate groups are blocked, an unblocking temperature of about 150° to 220° C. must be maintained. The finished end product may not contain any blocked or free isocyanate groups.

The stoichiometric calculation and the selection of the individual starting materials may be made so that Component A contains on average at least one tertiary amino group, preferably a lower ($C_1$ to $C_4$) dialkylamino group, per molecule. The lower limit of the amine number (expressed in mg of COH per gram of solid resin) is 35; it may suitably be above 50. The upper limit is 120; it may preferably be below 100, and particularly preferably below 80. When the amine number is too low, the solubility is too poor and the lacquer settles on standing. Furthermore, due to the high degree of neutralization, too high acid pH values are then obtained in the baths. When the amine number is too high, a poorly adhesive coating results. An irregularly thick, blistered surface can often be observed as a result of too strong electrolytic development of gas.

The hydroxyl number (expressed in mg of COH per gram of solid resin) present in a molecule is important for the crosslinking ability of the film. It may be more than 50, preferably more than 100.

While the upper limit of the hydroxyl number is 400, it may more advantageously be below 300. When the hydroxyl number is too low, on ester interchange films result which are still soluble in organic solvents, such as methylethyl ketone. However, when the hydroxyl number is too high, the film will be too brittle and may eventually also remain too hydrophilic. At least two cross-linkable, preferably primary, hydroxyl groups may be present in a molecule.

The synthetic resin binder containing tertiary amino groups, hereinafter also called the basic resin, may have a median molecular weight (Mn) of about 500 to 20 000, particularly 1000 to 5000 and a PK value of about 3 to 7.0. The PK value is the negative decimal logarithm of the basicity constant.

The cross-linking agent (component B) may be a resin, having terminal, esterified carboxyl groups and which is substantially stable in a neutral, aqueous medium, but which reacts, in the basic medium of the precipitated film at temperatures of about more than 140° C., with one or more hydroxyl-group-containing amino polyurethane (Component A). Substantially all of the terminal carboxyl groups may be esterified with alcohols which are volatile under baking conditions. In order to avoid a migration of component B to the anode, care must be taken that Component B contains an acid number below 20, preferably below 10, particularly preferably below 3. The cross-linking agent has and average molecular weight (Mn) of about 350 to 5000, particularly 500 to 3000. The reactivity of the esters may be improved by the use of primary monohydric alcohols, such as methanol or ethanol and by increasing the electrophilic activity of the carboxyl group by means of a suitable chemical structure. The lower the molecular weights of the alcohols which are split off during the ester interchange are, the lower are the cleavage losses. Various cross-linking agents of this type which are known and described in publication, can be used (see bibliography referred to in the introduction of the specification for transamidation or ester interchange methods).

A cross-linking agent of this type may be produced, for example, by ester interchange of dicarboxylic acid alkyl esters with polyhydric alcohols. Resins of the following general Formula have been found particularly reactive:

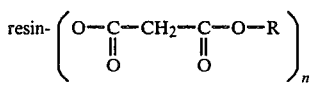

wherein n represents a value between 2 and 8, and R represents a straight chain or branched alkyl radical having from 1 to 8 carbon atoms, preferably methanol or ethanol. In the simplest case this cross-linking agent may be a reaction product of trimethylol propane and malonic acid dimethyl ester, as described in European patent document laid open to public inspection, No. 082 291.

Other cross-linking agents may, for example, be carboxyl-group-containing polyesters, the carboxyl groups of which are blocked by possibly substituted 1,2-glycols, resulting in the formation of β-hydroxy compounds:

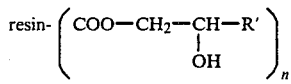

The 1,2-glycols introduced may suitably be substituted by saturated of unsaturated alkyl, ether, ester or amide groups, ie. R' may represent —R, —H, —CH₂—O—R,

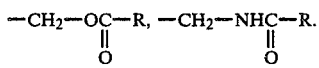

These cross-linking agents are described in European patent document laid open to public inspection No. 012 463, for example, as a reaction product of trimellitic acid anhydride with Cardura E (registered trade mark), the glycidyl ester of the acid available under the trade name "Versatic".

A further cross-linking agent capable of ester interchange may be obtained by Michael addition of aceto-acetic acid alkyl ester or malonic acid dialkyl ester to resins having activated unsaturated double bonds, resulting in

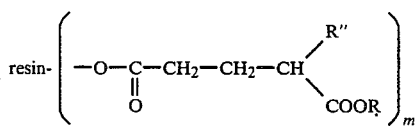

wherein R" stands for —COOR or —CO—R and m is a value between 1 and 8. These resins may be prepared, in the simplest case, from butane diol-diacrylate and aceto-acetic acid ester or from toluene diisocyanate hydroxyalkyl acrylate adduct and malonic acid dialkyl ester, as described in German 'Offenlegungsschrift' No. 33 15 469. The Michael addition can be performed stoichiometrically or by using excess double bonds.

The mixing ratio of Components A and B in the coating agent may fluctuate within wide limits. It may preferably be between 80:20 and 60:40, and may be determined empirically from optimally obtainable technical properties at the given baking temperature. A combination of a number of cross-linking systems can be of advantage in special cases. Even a few percent, for example, 0,5 to 5,0% by weight, of the cross-linking component described second (ie. the β-hydroxy compounds) can decisively reduce the susceptibility to pitting of the other cross-linking agents. The components may be mixed cold or may be also precondensed at elevated temperature. The Components A and B react mutually to a certain extent without the mixture losing its thermal curability and the property of being rendered water-soluble by protonation with acids.

0.1 to 10% by weight, preferably 2 to 6% by weight (relative to Components A and B) of metal oxides, metal salts or metal complexes of monovalent or polyvalent metals may be used as conventional ester interchange catalysts (Component C). These substances may generally be dissolved after salt formation with 2-ethyl hexanoic acid or napththenic acid in aliphatic and aromatic hydrocarbons. These solutions may then be emulsified into an electrophoresis bath. Another possibility resides in complex formation of the metals with acetyl acetonate, dicylopentadiene or 8-oxy-hydrochinoline. The catalyst may be antimony trioxide, cobalt naphthenate, lead octoate, iron acetylacetonate, reaction product of zinc oxide+8-oxy-hydrochinoline, thallium dicylopentadiene or triethanol amine titanate. Lead octoate and zinc oxyhydrochinolate are preferred. The metal catalysts may also be dispersed into the mixture in a finely distributed form as pigments, such as lead silicate. Water-soluble metal salts, as well, may be suitable as ester interchange catalysts, in which case the metal is precipitated as a compound or complex in a finely distributed form with the lacquer. Preferably the catalyst may be insoluble in the elctro-dipcoating bath and be distributed uniformly after the electro-phoretic precipitation in the precipitated film.

The cationic basic resin is rendered water-dilutable by protonation with acids in a manner known per se. Examples of usable acids are hydrochloric acid, formic acid, acetic acid, lactic acid, citric acid, malonic acid, acrylic acid, propionic acid, amino acetic acid, phosphoric acid or alkylphosphoric acid. Monobasic organic carboxylic acids are preferred. The acid must be added at least in such a quantity that the cationic basic resin is dissolved. An excess of acid, ie. a neutralization degree of over 100%, should be avoided. The MEQ value (milliequivalent acid per 100 g of solid resin) may generally be between 20 and 80.

The dipcoating agent may contain, in addition, conventional known in the lacquer art, such as an antipitting agent, flow promoting agents, defoaming agents etc. Naturally, these additives must be selected so that they do not cause disturbing reactions with water at an acid to neutral pH value, do not bring in disturbing foreign ions and do not precipitate after standing a fairly long time in a form which cannot be stirred up, ie. even after long standing the coating agent must be convertable to a usable dispersion.

As mentioned hereinbefore, the coating agent may contain up to about 20% by weight of organic solvents for reducing the viscosity, for controlling the precipitation voltage and for improving the adherence and flow. The lowest possible proportion of organic solvents, in particular under 15% by weight, and specially under 10% by weight, is desired. The solvents may include alcohols, glycol ether, keto-alcohols, possibly with the addition of aliphatic and aromatic hydrocarbons of various chain length. For the selection, it must be taken into account that component B is not water-soluble and portions of water-insoluble solvents could possibly facilitate and stabilize the dispersion process. The uniform coating property is impaired with an increasing proportion of solvent and over-coating may occur; the precipitated thickness of the coating is reduced with a decreasing proportion of solvent. The aprotic solvent required for the preparation of the Component A may possibly be exchanged after the preparation of the product for other solvents by distillation.

The proportion of solid matter of the coating agent according to the invention may be 5 to 30% by weight, preferably 10 to 20% by weight after diluting with water. The pH value of the lacquer may generally be between 5.0 and 7.0, preferably between 5.5 and 6.5. When the pH value is too low, an attack of acid on the iron of basins and pipe lines can be expected. The electrophoretic precipitation may take place at the earliest 24 hours after the preparation of the bath. During this time the bath may be stirred continuously to obtain uniform distribution. Electrically conductive, non-corroding electrodes, for example, of rustproof steel or graphite, may be used as the anode. The article to be coated cathodically and the anode may be immersed into an aqueous bath, as known for electrophoretic precipitation. All metallic conductive workpieces, for example, of copper, aluminium, tin, zinc, iron and alloys of these metals, may be coated. During precipitation the bath may be suitably maintained at temperatures of about 15° to 35° C. The solid body, the precipitation temperature and the precipitation period, as well as the voltage are selected so that the desired thickness of coating may be obtained, after rinsing with water and baking at temperatures of about 160° to 200° C. On applying an electric current with a voltage of suitably 50 to 500 volt between a metallic conductive workpiece and a counterelectrode the water-dilutable basic resin is coagulated at the cathode. It transports therewith the water-insoluble cross-linking agent, pigments, catalysts etc. The ratio of pigment to synthetic resin binder can shift thereby in the precipitated film in favour of the pigment.

At the same time water and the acid used for neutralization accumulate in the bath. Concentrated lacquers must be used therefore for refilling to compensate for this shifting, by changing the quantitative ratios. This correction can also be effected by suitable industrial equipment, for example, through electrodialysis methods.

The method of preparing the coating agents is preferably performed in two stages. According to another aspect of the invention, dipcoating agents which can be rendered water-soluble by protonation with acids are prepared by
1. reacting optionally blocked polyisocyanates with compounds which have at least one tertiary nitrogen atom and have one or more of the following groups:
   (a) at least 2 hydroxyl groups
   (b) at least 2 secondary amino groups
   (c) at least one primary amino group
   (d) at least one hydroxyl group and one secondary amino group, to form an intermediate product having possibly blocked isocyanate groups; and
2. reacting the intermediate product with a sufficient quantity of polyhydroxyl compounds so that all the possibly blocked isocyanate groups still present therein are reacted with hydroxyl groups, wherein the quantity of the compounds having the at least one tertiary nitrogen atom is sufficiently large so that the final reaction product has an amine number of 35 to 120, and wherein sufficient possibly blocked isocyanates, relative to the groups (a) to (d) are introduced so that a hydroxyl number of 50 to 400 is obtained after the reaction with polyhydroxyl compounds.

RESINS USED FOR EXAMPLES

Aminopolyurethane resin A1

468 g of anhydrous ethylacetate and 840 g of trimethyl hexane diisocyanate (4 mol) were placed in a four liter surface-ground flask including a stirrer, thermometer and reflux cooler under dried inert gas and heated to 40° C. The mixture of 59,5 g of N-ethyl-diethanol amine (0,5 mol) and 102 g of dimethylamino propylamine (1 mol) was added dropwise over a period of 2 hours, the temperature being maintained at 40° C. through cooling. Thirty minutes after terminating the dropwise addition, the NCO percentage was 16,8%. 402 g of trimethylol propane (3 mol) were then added all at once. The exothermic reaction raised the temperature to up to 60° C., notwithstanding cooling. This temperature was maintained until the NCO proportion was 0.45% (=g of NCO in 100 g of solution).

520 g of ethylene glycol monoethyl ether were then added and the lower boiling ethylacetate was distilled off as completely as possibly at 60° C. in vacuo.

Final values

Proportion of solid matter: 76.8% by mass (30 minutes baking at 180° C.)

Viscosity: 1.2 Pa.s (after diluting to 50% by mass with ethylene glycol monoethyl ether)

amine number: 59 mg of COH/g of solid resin

Hydroxyl number (calculated): about 120 mg of COH/g of solid resin

Aminopolyurethane resin A2

Method of preparation was as described for A1, but using the following quantities:

I.

376.9 g of anhydrous ethylacetate
1248.2 g of isophorone diisocyanate

II.

95.6 g of methyl diethanol amine
163.9 of dimethyl amino propyl amine
259.5 g of ethylacetate
  NCO proportion: 16.0%

III.

478.4 g of ethylacetate
478.4 g of trimethylol propane
The ethylacetate was distilled of and the product diluted with 455 g of ethylene glycol monoethyl ether.
Solid substance: 73.9% by mass
Viscosity: 1.3 Pa.s
amine number: 61 mg of COH/9
OH number (calculated): 76

Aminopropylurethane resin A3

603 g of anhydrous ethylacetate, 603 g of trimethylol propane, 133.5 g of dimethyl amino ethanol and 178.5 g of methyl diethanol amine are dissolved. Into this solution in a double wall flask there is added drop by drop a solution of 522 g of anhydrous ethylacetate and 1044 g of toluylene diisocyanate at 40° C., under thorough agitation and simultaneous cooling, over a period of 3 hours, wherein the temperature does not exceed 50° C. To complete the reaction, the mixture is then heated to 60° C. and after attaining a NCO proportion of 0% it is diluted with 490 g of ethylene glycol monoethyl ether. The ethylacetate is distilled off as completely as possible in vacuo at 60° C. and the product diluted with further 500 g of ethylene glycol monoethyl ether.

Solid matter: 57.7% by mass
viscosity: 12 Pa.s
amine number: 90 mg of COH/g
OH number (calculated): 145

Cross-linking agent B1

According to European patent document laid open to public inspection No. 12 463, p.17 Example 11(a), 781 g of trimellitic acid amhydride are dissolved at 100° C. in 1976 g of ethyl glycol monobutyl ether and mixed with 2236 g of Cardura E 10 (registered trade mark) and with 7 g of benzyl dimethyl amine. The mixture is heated to 120° C. under agitation and these conditions maintained until the acid number drops below 1.1 mg of COH/g.

The polyester has the following characteristic values:
Solid matter proportion: 70.7% by mass (60 minutes 125° C.)
acid number: 0.7 mg of COH/g of solid resin
epoxide equivalent mass: 10,000

Cross-linking agent B2 (according to German 'Auslegeschrift' 33 15 469, hardener 1.3)

A mixture of 108 g of hydroxy ethylacrylate, 81,8 g of a mixture of 2.4- and 2.6-toluylene diisocyanate, 3 drops of triethyl amine and 21 g of diethylene glycol dimethyl ether is heated for 5 hours at 60° C. The isocyanate content is then less than 0.2%. 1 g of potassium hydroxide solution (30% strength in methanol) and 128 g of malonic acid diethyl ester are then added and the mixture heated in a second stage for 6 hours at 120° C. The proportion of double bonds is then less than 0.2%. The reaction mixture is then diluted with ethylene glycol monoethyl ether to a solid matter content of 90% by mass. A highly viscous, clear fluid of a medium to strongly yellow colour is obtained.

Cross-linking agent B3 (from European patent document laid open to public inspection, No. 0082291, p.15. component B5)

480 g of malonic acid diethyl ester and 134 g of trimethylol propane are heated to 130° C. While controlling the refractive index, 135 g of ethanol are separated as distillate, the temperature slowly rising to 165° C. Further volatile components are then distilled off at 160° C. and increasing vacuum, until the proportion of solid matter of the reaction substance (residue after 30 minutes at 120° C.) is 95% by mass.

EXAMPLE 1

212 g of aminopolyurethane resin A1 were mixed with 75 g of cross-linking agent B2 and 5 g of cross-linking agent B1, 5,8 g of lead octoate (72% strength) and 8.25 g of formic acid (85% strength) and slowly diluted with fully desalted water to 2 liters while being agitated.

Solid matter content: about 12% by mass (15 minutes 185° C.)
pH value: 5.8
conductivity of bath: 2300 $\mu Scm^{-1}$
MEQ value (milliequivalent value) 50

A film was precipitated electrophoretically at 25° C. bath temperature for 2 minutes at 170 volt, on a zinc phosphated iron sheet (Bonder 132). After baking for 25 minutes at 180° C. (temperature of object) a hard smooth dry film of 16 $\mu$m thickness resulted, which was insensitive to the action of methylethyl ketone and did not yellow.

EXAMPLE 2

312.5 g of aminopolyurethane resin A1 was mixed with 70 g of cross-linking agent B3 and 5 g of cross-linking agent B I, 5.8 g of lead octoate (72% strength) and 8,25 g of formic acid (85% strength) and slowly diluted with fully desalted water to 2 liters.

Solid matter content: about 15% by mass
pH value 5.8
conductivity of bath: 2350 $\mu Scm^{1}$
MEQ value about 50

The lacquer was electrophoretically precipitated for 2 minutes at 180 volt and about 30° C. bath temperature on a zinc phosphated iron sheet. After rinsing and baking for 25 minutes at 180° C. (temperature of object) a hard dry film of 17 to 18 $\mu$m thickness resulted which was insensitive to methylethyl ketone and did not yellow.

EXAMPLE 3

243.6 g of aminopolyurethane resin A2 are mixed with 84.9 of crosslinking agent B1, 7.75 g of lead octoate (72% strength) and 11.7 g of acetic acid and slowly diluted to 2 liters with fully desalted water while being stirred.

solid matter content: 11.2% by mass
pH value: 6.0
conductivity of bath: 1830 $\mu Scm^{-1}$
MEQ value: about 60

A phosphate sheet is coated at the cathode for 2 minutes at 230 volt and a bath temperature of about 30° C. It is then rinsed and the coagulated coat baked to form a hard film which is stable in respect of solvents (20 minutes at 175° C.).

EXAMPLE 4

312 g of aminopolyurethane resin A3 are mixed with 75 g of cross-linking agent B1, 7.75 g of lead octoate (72% strength) and 20 g of lactic acid (80% strength) and slowly diluted to 2 liters with fully desalted water while being stirred.

Solid matter content: 11.7% by mass
pH value: 5.6
conductivity of bath: 1470 $\mu Scm^{-1}$
MEQ value: about 55

A phosphated sheet is coated at the cathode for 3 minutes at 215 volt and a bath temperature of about 30° C. After rinsing and baking for 25 minutes at 170° C., a hard film results which is stable in respect of solvents.

We claim:
1. A cathodically aqueous electro-dipcoating agent which can be rendered water-soluble by protonation with acids, and which comprises: as Component A,
50 to 99% by weight (relative to the total quantity of Components A and B) of a synthetic resin binder having urea or urethane groups, tertiary amino groups and hydroxyl groups, and which
(a) has an amine number of 35 to 120
(b) has a hydroxyl number of 50 to 400
(c) has substantially no primary, secondary and quaternary amino groups,
(d) has substantially no free isocyanate groups;

(e) has substantially no blocked isocyanate groups which can react at baking temperatures of up to 200° C. with hydroxyl groups present in the components; and (f) a median molecular weight from 500 to 20,000; as Component B, 1 to 50% by weight (relative to the total quantity of Components A and B) of substantially non-acid synthetic resins having an acid number below 20, an average molecular weight of about 350 to 5000, and at least two terminal esterified carboxyl groups which can react under normal lacquer baking conditions with Component A, accompanied by crosslinkage; and as Component C, a catalytically effective amount of an ester interchanging catalyst for the thermal ester interchange of Component A with Component B at a temperature of more than 140° C.

2. An electro-dipcoating agent according to claim 1, which includes one or more of a pigment, filler, protective corrosion inhibitor, lacquer vehicle, catalyst, and an organic solvent which, when present, is present in a quantity of up to 20% by mass, relative to the total mass of the dipcoating agent.

3. An electro-dipcoating agent according to claim 1 wherein Component A is produced by reacting a polyisocyanate compound and a hydroxyl compound, and the ratio of isocyanate groups therein to the total of the hydroxyl groups introduced thereinto is 1:1 to 1:4.

4. An electro-dipcoating agent according to claim 1, wherein the molecules of Component A have, on average, at least one tertiary amino group each.

5. An electro-dipcoating agent according to claim 1 wherein the synthetic resins of Component B are in accordance with the general Formula

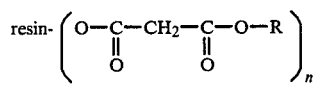

wherein n represents a value between 2 and 8, and R represents a straight chain or branched alkyl radical having from 1 to 8 carbon atoms; or

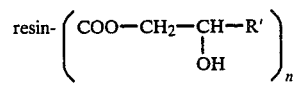

wherein R' represents —R, —H, —CH$_2$OR,

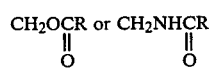

and n and R are as defined hereinbefore; or

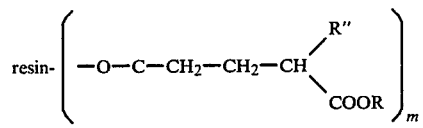

wherein R" represents —COOR or —COR, m represents a value between 1 and 8 and R is as defined hereinbefore.

6. A method of preparing an elecro-dipcoating agent according to claim 1, and which can be rendered water-soluble by protonation with acids, which includes:

I. reacting blocked polyisocyanates with compounds which have at least one tertiary nitrogen atom and have one or more of the following groups:

(a) at least 2 hydroxyl groups, (b) at least 2 secondary amino groups, (c) at least one primary amino group, (d) at least one hydroxyl and one secondary amino group, to form an intermediate product having possibly blocked isocyanate groups, and II. reacting the intermediate product with a sufficient quantity of polyhydroxyl compounds so that all the possibly blocked isocyanate groups still present therein are reacted with hydroxyl groups, wherein the quantity of the compounds having the at least one tertiary nitrogen atom is sufficiently large so that the final reaction product obtained has an amine number of 35 to 120, and wherein sufficient possibly blocked isocyanate groups relative to the groups (a) to (d) are introduced so that a hydroxyl number of 50 to 400 is obtained after the reaction with the polyhydroxyl compounds.

7. An electro-dipcoating agent according to claim 3, wherein the ratio of isocyanate groups to hydroxyl groups is from 1:1.2 to 1:2.

8. An electro-dipcoating agent according to claim 1, wherein Component A has an amine number of 50 to 100.

9. An electro-dipcoating agent according to claim 1, wherein Component A has a hydroxyl number of 100 to 300.

10. An electro-dipcoating agent according to claim 1, wherein Component A has a molecular weight from 1000 to 5000.

11. An electro-dipcoating agent according to claim 1, wherein substantially all of the terminal carboxyl groups of Component B are esterified.

12. An electro-dipcoating agent according to claim 1, wherein said esterified terminal carboxyl groups of Component B are esterified with alcohols which are volatile under baking conditions.

13. An electro-dipcoating agent according to claim 1, wherein Component B has an acid number below 10.

14. An electro-dipcoating agent according to claim 13, wherein Component B has an acid number below 3.

* * * * *